United States Patent [19]

Dyer

[11] 3,986,484

[45] Oct. 19, 1976

[54] CAMSHAFT FOR CONTROLLING VARIABLY OPENING VALVES

[76] Inventor: Glenn L. Dyer, Four Fox Run Road, Bedford, Mass. 01730

[22] Filed: Oct. 14, 1975

[21] Appl. No.: 622,219

Related U.S. Application Data

[63] Continuation-in-part of Ser. No. 524,955, Nov. 18, 1974, Pat. No. 3,913,699.

[52] U.S. Cl. .......... 123/90.18; 123/90.15; 123/90.16

[51] Int. Cl.[2] .......... F01L 1/34

[58] Field of Search .......... 123/90.18, 90.15, 90.16, 123/90.17; 180/66 C; 60/39.63

[56] References Cited

UNITED STATES PATENTS

| | | | |
|---|---|---|---|
| 920,417 | 5/1909 | Berliet | 123/90.18 |
| 2,591,540 | 4/1952 | Grylls | 180/66 A |
| 2,815,010 | 12/1957 | Miller | 123/90.18 |
| 2,994,394 | 8/1961 | Underwood | 180/66 A |
| 3,913,699 | 10/1975 | Dyer | 123/90.18 |

*Primary Examiner*—Charles J. Myhre
*Assistant Examiner*—Daniel J. O'Connor
*Attorney, Agent, or Firm*—Weingarten, Maxham & Schurgin

[57] ABSTRACT

A longitudinally slidable cam shaft means for use with an automotive power system having improved efficiency and low pollution characteristics. The drive motor operates only when power to the wheels is desired and includes variably opening valves controlled by the cam shaft means. The axially sliding cam shaft controls the valves which may be opened by varying amounts to control the speed and direction of rotation of the drive motor. Regenerative braking is provided by the drive motor and by reversing the direction of rotation of the cam shaft, the valves act to send compressed gas to the combustion chamber.

18 Claims, 40 Drawing Figures

Fig. 17.
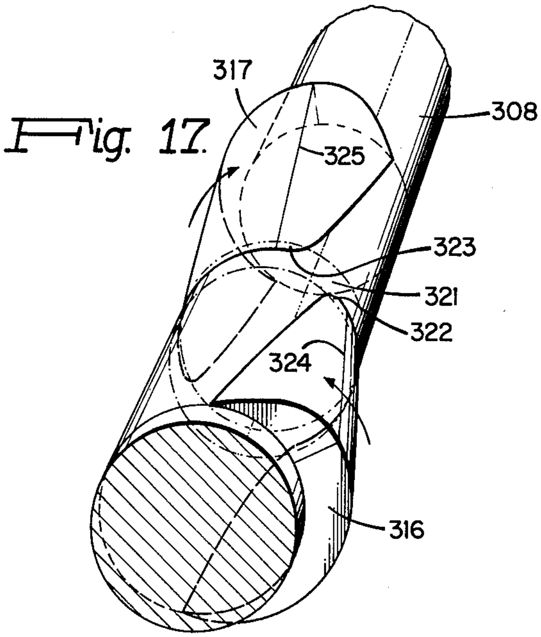
Fig. 19.
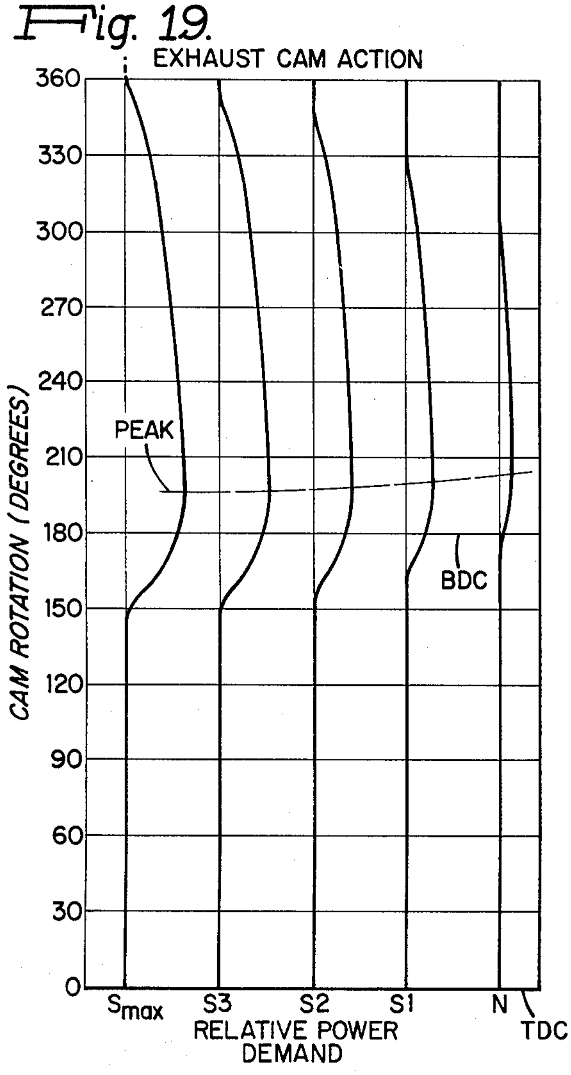
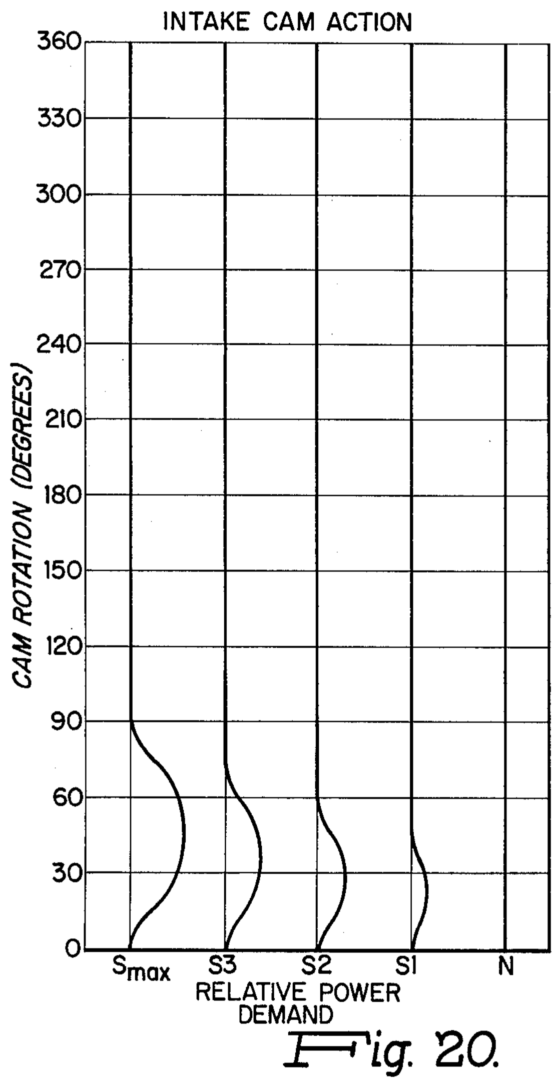
Fig. 20.

CAMSHAFT FOR CONTROLLING VARIABLY OPENING VALVES

CROSS REFERENCE TO RELATED APPLICATION

This is a continuation-in-part of my previously filed United States patent application Ser. No. 524,955 filed Nov. 18, 1974, now U.S. Pat. No. 3,913,699.

FIELD OF THE INVENTION

This invention relates generally to automotive power systems and more particularly concerns a cam shaft for use with a novel external combustion engine using two independently operating positive displacement motors and an energy storage reservoir.

DISCUSSION OF THE PRIOR ART

Conventional power systems for use with automobiles are very inefficient means for providing transportation for people or goods. Typical brake thermal efficiencies, measured under ideal bench conditions, range from 20% for small engines to about 30% for larger ones. Diesel brake terminal efficiencies range between 30% and 35%. However, these stated efficiencies fall off significantly under normal operating road conditions. Energy losses are due to many factors including internal friction and parasitic losses, rolling resistance and air drag. Internal parasitic losses in an internal combustion powered car arise from mechanical inefficiencies (especially in the transmission), power used to operate the fan, generator, oil pump and distributor, plus losses in the carburetor and muffler, among others. Additionally, there are auxiliary power uses for heating, air conditioning, radio and other optional power equipment. The auxiliary power losses range between 5% and 10% while internal losses average 40% of the rated engine brake horsepower.

Certain of the above enumerated power losses are constant and would be common to any type of power system. However, it is possible for the type of engine employed to provide significant improvements in both internal frictional and parasitic losses. Other considerations in the design of an automotive power system to be discussed throughout this application are very important and point out the fact that presently used power systems are not ideally suited to the peculiar requirements of an automobile.

The internal combustion engine is best suited for a constant speed, steady horsepower situation such as powering an airplane. It is not difficult to operate such an engine at optimum levels for the best possible efficiency of fuel used. However, in an automobile there are multiple, extreme and fast ranging variations to which it is subjected. Changes vary rapidly from acceleration to deceleration, from times when the engine is idling and the vehicle is not moving to relatively efficient steady state operation. Specifically, the average power requirement of an internal combustion engine of the type used on conventional automobiles is very small compared with the maximum power requirement, and the conventional internal combustion engine is ill suited to efficiently accommodate all of the variations necessary during normal operation of an automobile.

Conventional power systems used in motor vehicles employ the Otto cycle or the Diesel cycle. Even rotary engines are based upon the four-stroke Otto cycle. Rankine cycle (steam) engines and electric motors have also been employed at various times for automotive power purposes and their advantages and disadvantages are well known. Other types of power systems have been conceived and to some extent developed but none have proven sufficiently successful to displace internal combustion engines based upon the Otto and Diesel cycles.

In designing an engine for automotive power use, certain primary criteria should be taken into consideration, along with other somewhat less important considerations. The power source should be capable of delivering high torque for short periods of time as necessary. It must also be capable of operating at high speeds at relatively low torque. Thus the torque requirements are that high torque is required when the vehicle is accelerated from the rest position or from low speeds but only a low torque is necessary to maintain a steady speed. The ideal engine should be self-starting and should produce maximum torque at zero speed with torque dropping to zero at the maximum speed at which the engine can run. It would be desirable to consume no fuel when the vehicle is at rest, thus the engine should not run when power is not required. Another criterion is to make use of the negative power available, that is, to have the means for regenerative braking and energy storage. Another significant criterion is that the engine should be inherently low polluting. Very little is gained if the engine has relatively high basic efficiency but at the same time requires significant add-on equipment to reduce the pollution it tends to produce.

Several other criteria may be referred to as secondary but they are nevertheless of importance. A minimum of power-consuming auxiliaries such as fan, water pump, transmission, muffler, power steering and power brakes among others would be desirable. The engine should be easy to start at all temperatures including sub-zero temperatures which occur in extreme northern climates. Such a power system should also be relatively maintenance free and inexpensive to service.

SUMMARY OF THE INVENTION

The automotive power system disclosed herein satisfies most of the criteria, both primary and secondary, set forth above, and will achieve a brake terminal efficiency of approximately 35%. The cam shaft means claimed herein controls the operation of the drive motor of the power system. When comparing the total efficiency of fuel from crude oil to power available at the wheels, the present power system is approximately 2½ times more efficient than a conventional gasoline powered automobile. This power system comprises a compressor for supplying compressed air to a combustion chamber where the air is heated and the pressure further increased in order to drive the compressor motor and the drive motor. The compressor, compressor motor and drive motor are positive displacement units and may either be reciprocating piston or rotary piston type engines. The system is adapted from the Joule (or Brayton) cycle. Air at atmospheric pressure is drawn into the compressor and compressed adiabatically to 1/15th of its original volume. It then enters the combustion chamber at forty times atmospheric pressure. Fuel is supplied to the combustion chamber at a controlled rate where it is burned at substantially constant pressure. The heated gas is then supplied to power the two motors. The positive displacement compressor and compressor motor are connected directly together through a common crank shaft so that they operate in unison. The power used by the compressor motor is controlled by a cam shaft which opens the compressor motor valves by varying amounts and may operate somewhat similarly to the drive motor cam shaft. The speed and direction of rotation of the drive motor is controlled by valves which in turn are controlled by the axially sliding cam shaft of this invention to govern the extent of valve openings and the relative timing thereof. The valves may be controlled in such a way as to permit the drive motor to act as a compressor when the load torque reverses so as to supply power to the motor and thereby act as a regenerative device to restore energy to the combustion chamber. Because the combustion chamber is relatively large, it acts as a reservoir for significant energy storage.

There is neither a gear shift lever nor a transmission because the engine speed and direction are controlled by the sliding cam shaft and the valves which it operates. Thus, the controls consist of a forward pedal equivalent to the conventional accelerator, a brake, and a reverse pedal which under certain conditions, operates in conjunction with the brake pedal.

There are essentially no residual products of combustion because the fuel/air mixture is set at approximately one-third of the stoichiometric mixture, because of the relatively long time such products are inside of the large combustion chamber at a lower temperature of approximately 1500°K and also because the combustion chamber has hot walls. Conventional engines have relatively cool walls causing flame quenching but with a central flame temperature up to 3000°K often resulting in the existence of substantial amounts of carbon monoxide, unburned hydrocarbons, dissociation of oxygen and the production of oxides of nitrogen. The present power system does not suffer from these deficiencies.

The system of this invention also includes means for coupling the drive motor directly to the differential. Preferably the drive motor would be mounted adjacent the differential and rear axle so the coupling would be as efficient as possible.

The mode of operation of this automotive power system is such that it has advantages over any known engine. By having a combined combustion chamber and energy reservoir which is relatively large, extremely large torques are available for limited times which are sufficient for any reasonably forseeable condition. By having two separate motors driven by the high pressure gases in the combustion chamber, it is not necessary to waste energy on internal friction losses. When the car is at rest, the drive motor is not operating and energy requirements are very low so that the compressor motor operates only intermittently to maintain the pressure within certain predetermined limits in the combustion chamber. On the other hand, even when the automobile is moving under influence of the drive motor, the compressor motor still operates only intermittently as necessary to maintain the pressure. Furthermore, by employing the regenerative capabilities of the drive motor, deceleration provides energy storage by means of the drive motor acting as a compressor and supplying high pressure air to the combustion chamber. The level of atmospheric contaminants produced by this system is very low due to several factors mentioned above which will be further discussed herein-below. This means that add-on anti-pollution devices are unnecessary, dispensing with another source of energy usage. Fuel economy significantly higher than in conventional engines is also realized because the fuel is completely burned, yielding maximum heat. Another factor increasing efficiency of this system is that operation of the compressor motor is not dependent on the load. Thus, the cutoff point of the compressor motor can be kept near the optimum value by an automatic pressure control system.

The drive motor of this invention has a displacement which is approximately one-fourth of the total combined displacement of the drive motor, compressor and compressor motor, which total displacement is comparable to the total displacement of the conventional internal combustion engine. Thus, at light loads the average frictional losses in the compressor and compressor motor are very small because these elements of the system run a very small percentage of the time so that the overall brake thermal efficiency remains quite high. Another factor contributing to high fuel economy is that heat losses are relatively small, partially resulting from the fact that although the combustion chamber is large, it is well insulated, its internal temperature is relatively low and possible heat loss is minimized. The average gas temperature in the compressor motor and drive motor is substantially lower than that in the cylinders of conventional Diesel or spark-ignition engines.

This system has no spark plugs (one simple ignition plug or hot wire) or ignition system normally comprising a distributor and contact points, so there are none of the timing requirements which contribute significantly to maintenance problems in a conventional engine. The fuel injection system of this invention is relatively simple, having no timing requirements and it may operate at a significantly lower pressure than does the Diesel engine fuel injection system. The overall cooling requirements are significantly less than the conventional engine, one reason being that there are no cooling requirements at zero speed. Such an engine lends itself to air cooling, thereby eliminating complex fluid cooling systems including hoses, radiators and pumps. Furthermore, there is no need for a carburetor or an automatic transmission, both being high maintenance items in conventional power systems. The exhaust system temperature is lower than for either the Otto or Diesel engines thereby requiring less maintenance, and the noises which must be reduced will normally be less than in conventional systems, thereby permitting the muffler to be a simpler device. The battery requirement is smaller and the starting motor is eliminated. Because of the high efficiency, the fuel tank is substantially smaller than in the conventional automobile. Crank case oil has a longer life because it is not diluted by unburned fuel which is blown by the pistons of conventional engines, since the fuel only appears in the combustion chamber and not in the cylinders of any of the motors. Further, a wide variety of types and grades of fuel may be used, including liquid, gaseous and possibly solid fuels, and grades as low as crude oil.

BRIEF DESCRIPTION OF THE DRAWING

The objects, features and advantages of this invention will be more clearly perceived from the following detailed description taken in conjunction with the drawing in which:

FIG. 17 is a perspective view of a portion of an alternative exhaust cam shaft which may be used to control the drive motor;

FIG. 19 is a graphical representation of the exhaust cam action of the cam shaft of FIG. 17; and FIG. 20 is a graphical representation of the intake cam action of the cam shaft of FIG. 18.

DETAILED DESCRIPTION OF THE PREFERRED EMBODIMENTS

Figure 1:
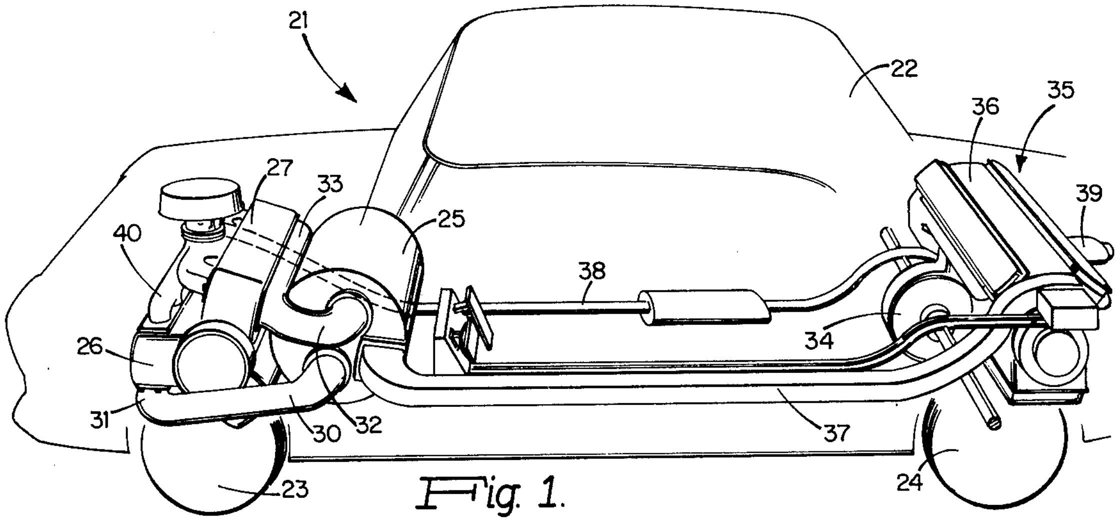
FIG. 1 is a phantom perspective representation of an automobile showing the power system of this invention mounted therein.
Figure 2:
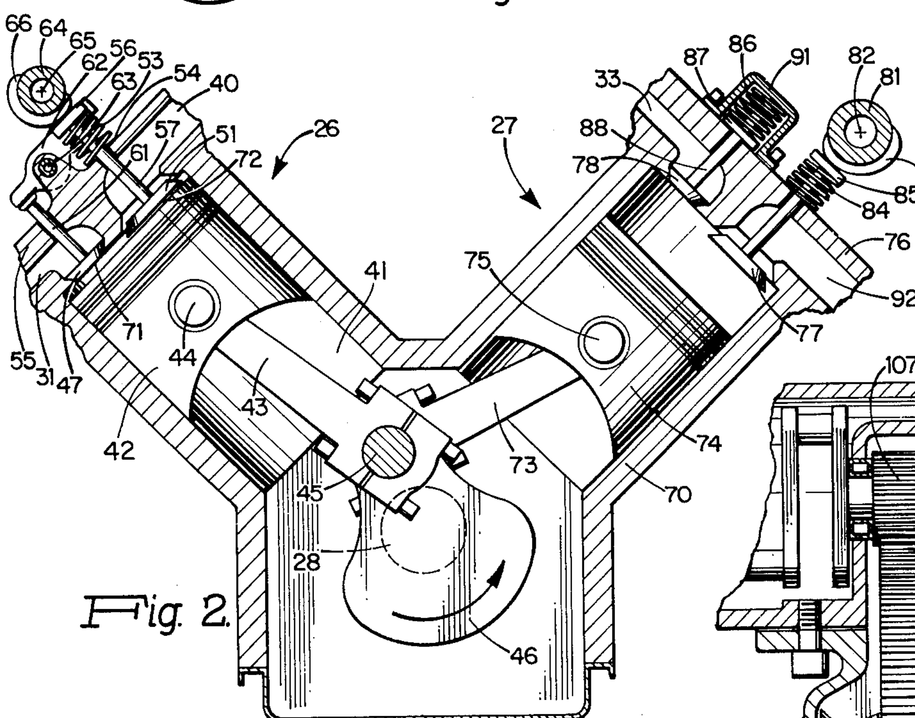
FIG. 2 is a section through the compressor and compressor motor of FIG. 1.

With reference now to the drawing and specifically to FIG. 1 thereof, there is shown an automobile 21 having a body 22 and front and rear wheels 23 and 24 respectively. At the forward end of the automobile is combustion chamber 25 which may be spherical, cylindrical, egg-shaped or have any practical configuration. Compressor motor 26 and compressor 27 operate about a common crank shaft 28 (FIG. 2). The compressor motor is coupled to the combustion chamber by means of conduit 30 connected to manifold 31 and the compressor is coupled to the combustion chamber by means of conduit 32 connected to manifold 33. On the rear axle is located differential 34 which is directly coupled by means of a pinion gear to drive motor 35 which is coupled to the combustion chamber through manifold 36 by means of conduit 37. Exhaust system 38 is connected to compressor motor 26 through manifold 40, and exhaust system 39 is connected to drive motor 35.

In general, the operation of the power system shown in FIG. 1 is that a combustible mixture in the combustion chamber is ignited increasing the pressure therein sufficiently to drive compressor motor 26 which in turn drives compressor 27 which supplies high pressure air to the combustion chamber. After ignition, the pressure in the combustion chamber very quickly increases to a predetermined operating value such as 40 atmospheres. When the accelerator is depressed, the intake valves in the drive motor are opened and the drive motor applies power directly to the differential to cause the rear wheels to turn. Preferably, the compressor motor/compressor will be comprised of a positive displacement V-16 arrangement, that is, it has a V-shaped configuration with eight cylinders on each side. The drive motor is mounted directly to the frame of the automobile and is preferably a 12-cylinder in-line (I-12) positive displacement motor. The elongated configuration of an I-12 motor assists in air cooling, generally all the cooling that is necessary for this motor.

Valve means, together with a cam shaft to operate the valve means, are provided in the drive motor to allow a large variation of the cutoff point, to permit reversal of the motor, and to allow the motor to act as a compressor when the load torque reverses in such a way as to supply power to the motor from the wheels. Valve means are also provided in the compressor motor for control by a pressure feedback loop so that the compressor will operate automatically to maintain the pressure in the combustion chamber within a desired range.

The compressor motor and compressor are shown in sectional detail in FIG. 2. The compressor motor 26 comprises a series of cylinders 41 containing piston 42 pivotally coupled by means of rod 43 and pin 44 to crank 45 of crank shaft 28. Element 46 is a conventional counterweight used for balancing the crank shaft. At the head of cylinder 41 is intake valve 47 which controls the high pressure gas entering the chamber intake through manifold 31. Exhaust valve 51 controls the exhaust gases leaving the chamber through exhaust manifold 40. Exhaust valve 51 is biased to the closed position by means of spring 53 while intake valve 47 is biased to the closed position by means of a similar spring, not shown, located directly behind spring 53 as shown in FIG. 2 and acting upon rocker arm 62. Spring 53 extends from bearing surface 54 on head 55 to cap 56 affixed to the end of the valve stem 57. Note that cap 56 also doubles as a cam follower in opening and closing the valve. Valve stem 61 of intake valve 47 is pivotally connected to rocker arm 62 which is pivoted by means of pin 63 to head 55. Cam shaft 64 rotates about axis 65 and has several cam surfaces such as lobe 66 for controlling the opening and closing of the valves. Cam shaft 64 is in some respects similar to the cam shaft employed in the drive motor and details of the compressor motor cam shaft will be discussed later.

When piston 42 is at approximately top dead center, that is, very closely adjacent the top of cylinder 41, it is also very close to the inner surfaces 71 and 72 of the intake and exhaust valves respectively. When the piston has just passed top dead center, cam shaft 64 has rotated to such a position that intake valve 47 opens and admits high pressure gas through intake manifold 31. This forces piston 42 downward in the cylinder toward the crank shaft causing a driving action and resulting in rotation of the crank shaft. Prior to reaching the end of the downward motion of the piston, intake valve 47 closes and exhaust valve 51 is opened at least by the time bottom dead center is reached so that as the piston travels upwardly again, the spent gases are forced out through exhaust manifold 40, readying the piston and chamber for another power stroke. The camming action of the valves must be such that exhaust valve 51 is closed just before the piston reaches top dead center so that there is no interference between the piston and the valve. This is necessary because no combustion occurs within the cylinder, permitting efficiency to be optimized by reducing the cylinder volume to substantially zero at top dead center. Cam shaft 64 may be longitudinally slidable and have varying shaped cam surfaces to alter the period for admitting high pressure gas to the cylinder according to the power requirements of the compressor. Also, it may be necessary to vary the valve opening time depending upon the gas pressure available, that is, there are times, especially when the engine has just started, when the pressure of the gas in the combustion chamber has not yet reached the predetermined operating value so that greater intake time would be necessary for similar power requirements.

The compressor motor is directly coupled to and drives the compressor 27 through common crank shaft 28. Piston rod 73 is pivotally mounted to piston 74 within cylinder 70 by means of pin 75 and may be coupled to crank 45, as is piston rod 43 of the compressor motor. Thus, when crank shaft 28 rotates under the impetus of the compressor motor, the pistons of the compressor are forced to reciprocate, providing highly compressed air to be injected into the combustion chamber. In cylinder head 76 are mounted intake valve 77 and exhaust valve 78. Cam 81 rotates about axis 82 and has cam surfaces or lobes 83 to operate the intake valves. Compression spring 84 bears against the outer surface of cylinder head 76 and the under surface of valve cap 85 thereby biasing the intake valve to the closed position. Exhaust valve 78 is normally biased to the closed position by means of spring 86 bearing against ring 87 mounted to valve stem 88 and against the under side of cover 91. When exhaust valve 78 opens due to pressure within cylinder 70, which is greater than the force of spring 86 together with the back pressure from the combustion chamber, compressed air passes outwardly through conduit 32 via manifold 33 into combustion chamber 25.

In operation, when piston 74 commences its expansion stroke from top dead center, intake valve 77 opens either pursuant to the action of cam shaft 81 or because the spring 84 permits the valve to open under a predetermined vacuum thereby permitting the cam shaft to be dispensed with. Incoming air passes through intake 92 into cylinder 70 above piston 74. By the time piston 74 reaches the bottom of its travel in the chamber, intake valve 77 has closed and compression commences. When the pressure within cylinder 70 reaches a predetermined value, exhaust valve 78 opens and highly compressed air is forced into the combustion chamber. The exhaust valve is preferably pressure operated but it may be positively operated by means of a cam if desired. Exhaust valve 78 remains open until the pressure in the cylinder drops below another predetermined value, at which time piston 74 is at substantially top dead center, and at which time spring 86 forces the exhaust valve closed and once again, as the piston starts its downward stroke, intake valve 77 opens. It is necessary that intake valve 77 remain closed while the piston is at or near top dead center to preclude any possibility of interference between those two elements, since the top dead center volume is nearly zero.

Figure 3:
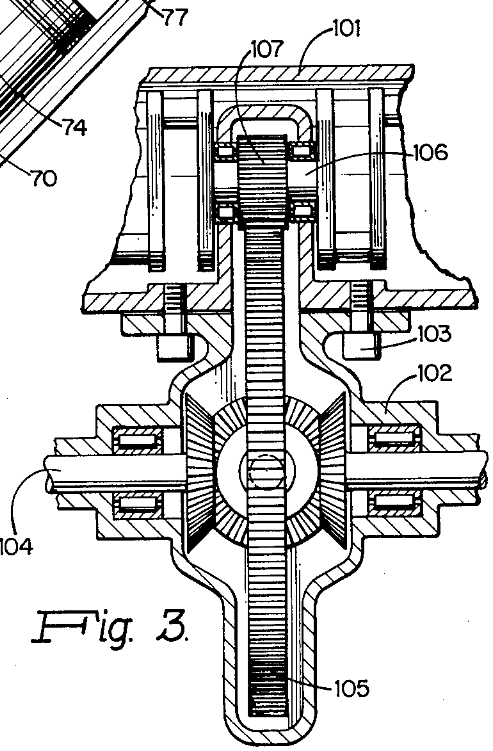
FIG. 3 is a sectional view through the differential and drive motors crank shaft and pinion assembly.

The basic valve construction and arrangement in the drive motor are similar to those described for the compressor motor and compressor. Drive motor 35 is preferably formed in an I-12 configuration as previously mentioned and is shown mounted to the frame of the automobile and directly coupled to the differential. However, other motor arrangements such as a V-12 could also be used. The connection between the drive motor and the differential is shown in FIG. 3. Drive motor crank case 101 is directly mounted to differential housing 102 by suitable means, such as bolts 103. Axle 104 is coupled to ring gear 105 by conventional gearing. Crank shaft 106 of drive motor 35 has pinion 107 mounted thereto for engagement with ring gear 105 of the differential. When the drive motor is rotating so as to drive the wheels in a forward direction, crank shaft 106 causes ring gear 105 to rotate in the proper direction by means of pinion 107. If the car is to go in reverse, the direction of rotation of the crank shaft is in the opposite direction, causing the ring gear to also rotate in the opposite direction, driving the wheels in reverse.

Figure 4:
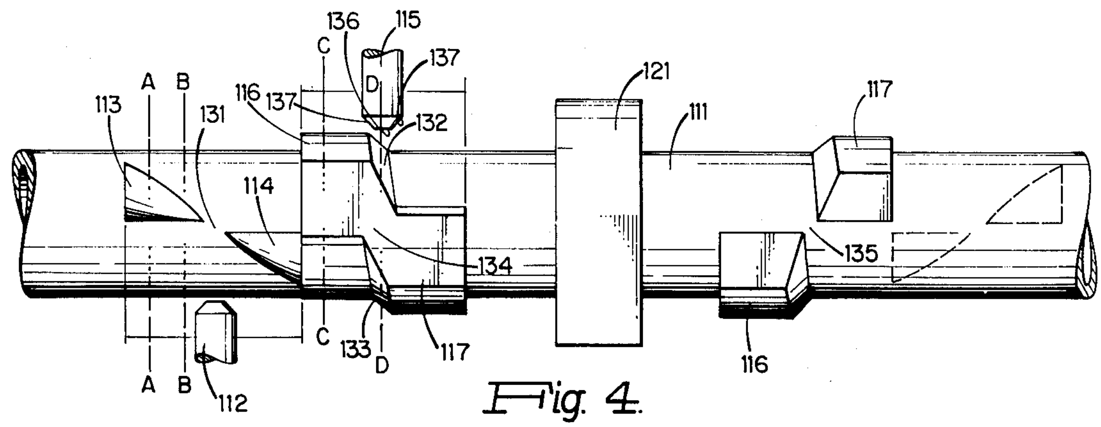
FIG. 4 shows a portion of one embodiment of a sliding cam shaft which is used with the drive motor of the invention.
Figure 5:
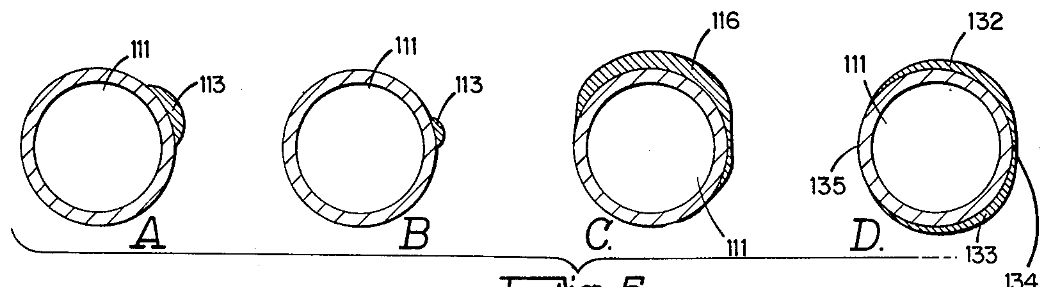
FIGS. 5A through 5D are transverse sections through the cam shaft of FIG. 4.
Figure 6:
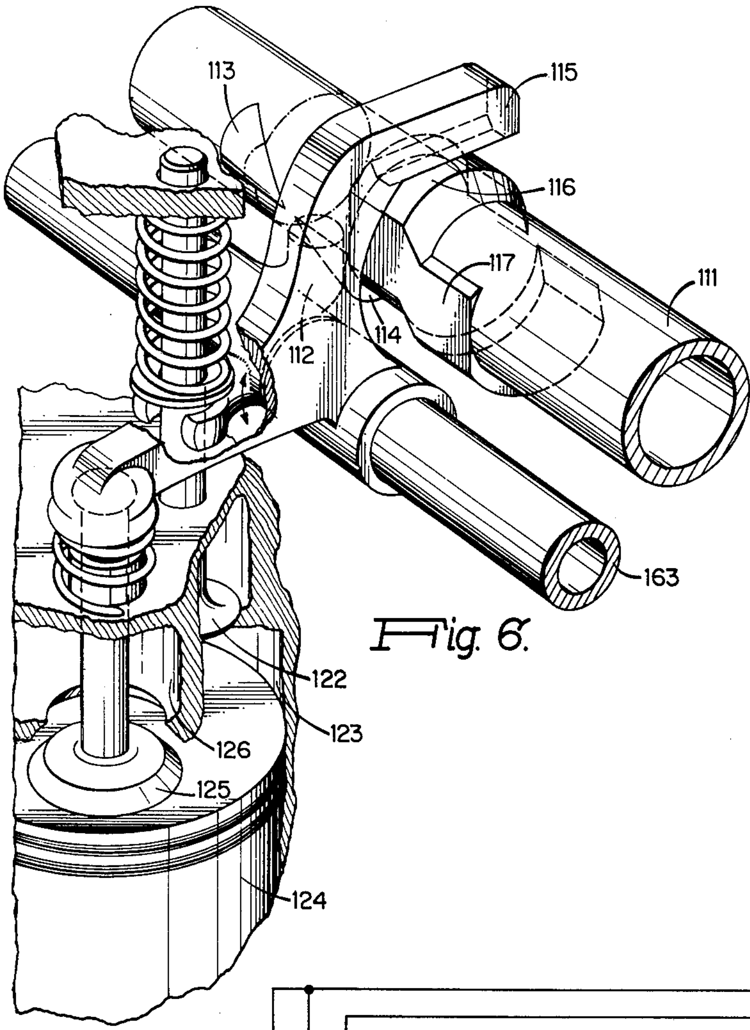
FIG. 6 is an enlarged partial view in perspective of a portion of the cam shaft shown in FIG. 4 in relation to a piston and the intake and exhaust valves associated with it.
Figure 7:
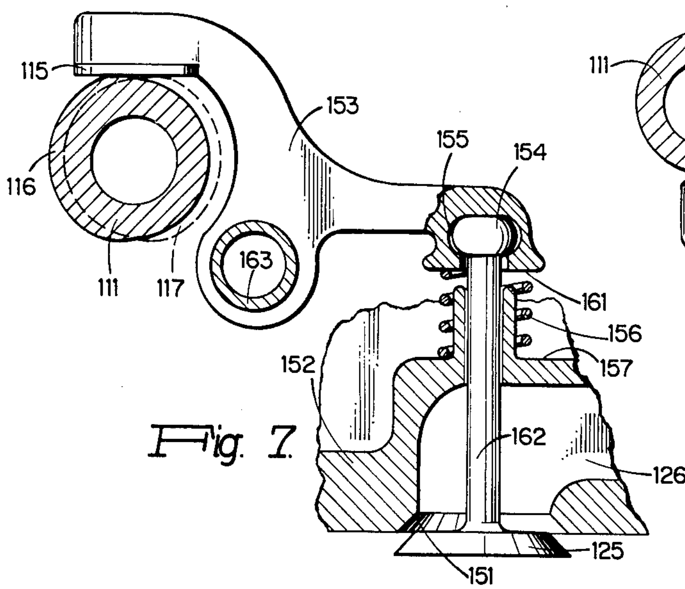
FIGS. 7 and 8 are enlarged details of rocker arms and cams which may be used with the drive motor of this invention.
Figure 8:
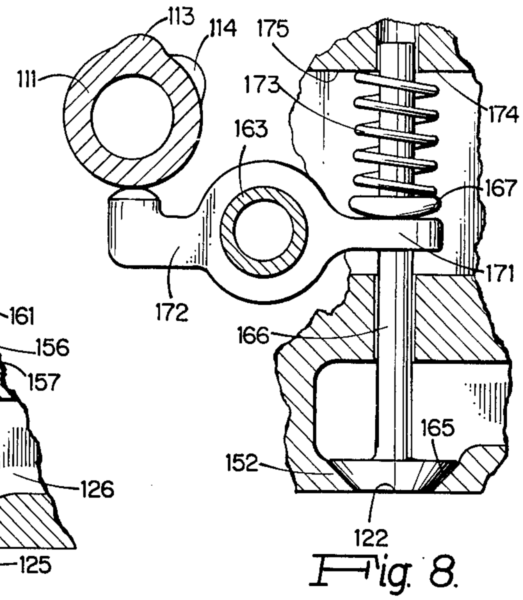
Figure 18:
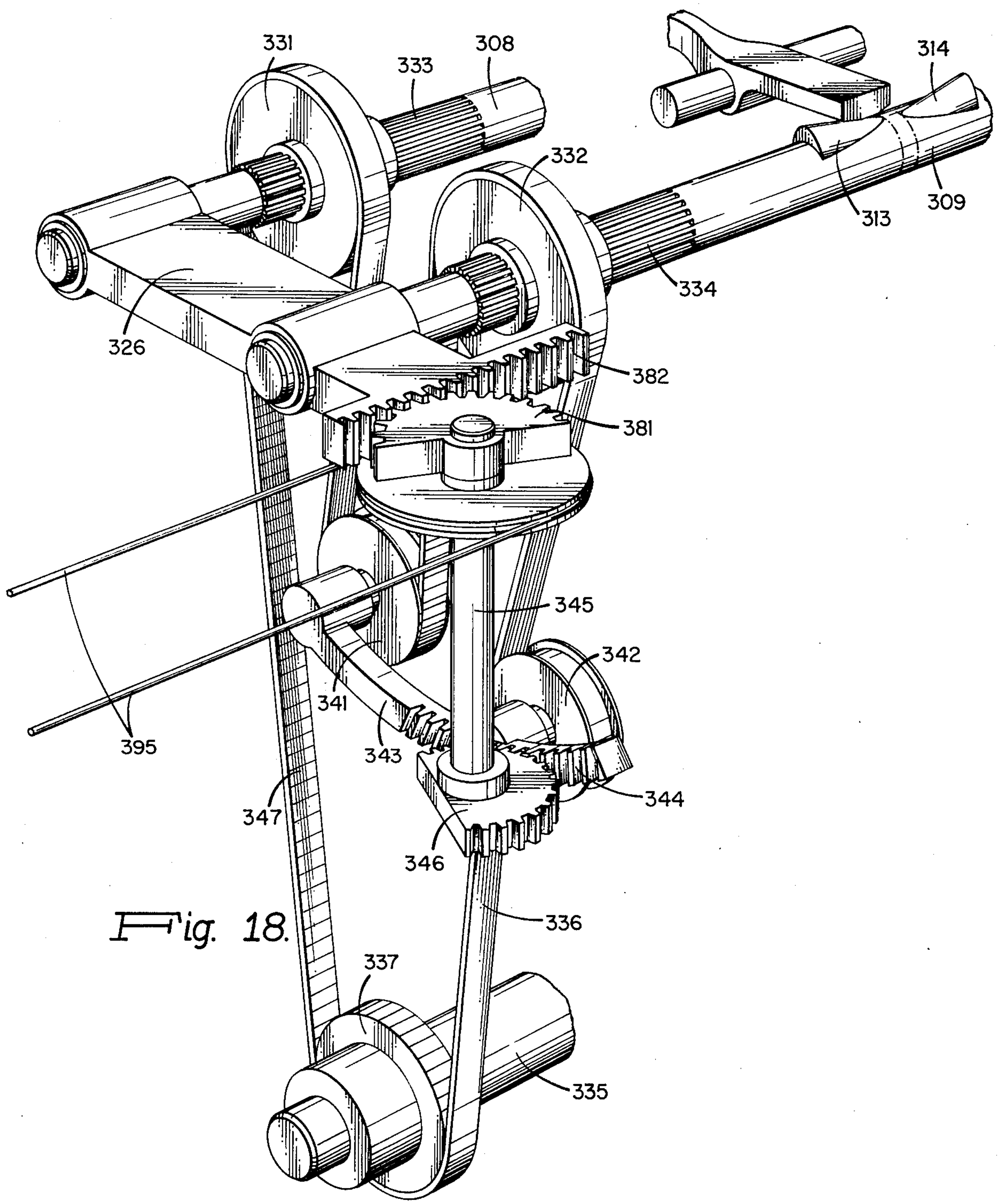
FIG. 18 is a perspective view of a portion of an alternative intake cam shaft which may be used together with the cam shaft of FIG. 17, and the mechanism by which the cam shaft positions are controlled.

As indicated previously, the drive motor is operable in either direction of rotation and may act as a motor or as a compressor, depending upon the position of the cam shaft with respect to the valves. That is, the cam shaft is longitudinally slidable and each cam lobe varies in its radial thickness and the angular width of its surface which contacts the valve lifters or rocker arms. A portion of a first embodiment of the sliding cam shaft 111 is shown in FIG. 4, transverse sections through it are shown in FIG. 5, its location with respect to the valves in a cylinder of the drive motor are shown in FIG. 6, while details of the valves and their rocker arms are shown in FIGS. 7 and 8. An alternative cam shaft embodiment is shown in FIGS. 17 and 18, graphical representations of its action are shown in FIGS. 19 and 20, and means for adjusting the cam shaft position are also shown in FIG. 18.

The cam lobes on shaft 111 are skewed symmetric. That is, there are two intake valve cam lobes which are substantially identical in shape and which are symmetrically positioned on opposite sides of a line on the surface of the cam shaft which is parallel to the axis of rotation of the shaft and they are also linearly displaced along the line as shown in FIG. 4. Thus, associated with intake valve cam follower 112, there are forward cam lobe 113 and reverse cam lobe 114, while associated with exhaust valve cam follower 115, there are forward lobe 116 and reverse lobe 117. Note that followers 112 and 115 are on opposite sides of the cam shaft, as further shown in FIG. 6, and that the cam shaft is shown in neutral position in FIG. 4. When the drive motor is operating as a motor, cam shaft 111 is shifted, for example, to the right, sliding through bearing 121 so that lobe 113 is aligned to make contact with intake valve cam follower 112. The distance by which the cam shaft is slid is determined by the amount of acceleration desired. Thus, if a very small acceleration is necessary, the cam shaft is slid to the right by a relatively small amount so that cam follower 112 makes contact with the smaller or less pronounced portion of lobe 113, thereby opening the intake valve 122 (FIG. 6) a small amount and for a relatively short period of time. The high pressure gas admitted to the cylinder 123 when the intake valve is open forces piston 124 downward in a power stroke, the amount of power depending upon the pressure and volume of high pressure gas which enters the cylinder. At or shortly after the period at which the piston reaches the end of the power stroke, exhaust cam follower 115 is contacted by lobe 116 to open exhaust valve 125 and permit the spent gases to be exhausted from the cylinder. If greater acceleration is desired, it is a simple matter, by means of the accelerator, to shift the cam shaft farther to the right, causing follower 112 to contact a larger portion of cam lobe 113. This results in intake valve 122 being opened by a greater amount and for a greater period of time thereby admitting a significantly larger volume of high pressure gas and applying substantially more force to piston 124, thereby producing a more powerful stroke. The timing of the exhaust valve cam lobes must be such that the exhaust valve is closed when the piston closely approaches top dead center and remains closed until the piston starts its downward motion. This is necessary in order to avoid interference because the piston essentially reduces the cylinder volume to nearly zero at top dead center.

When the cam shaft is slid to the left past its center position, the function of the valves is reversed and the motor can operate either as a compressor or if the motor was not turning in the forward direction, it will then commence operating in the reverse direction. Assuming that the automobile is moving forward and it is desired to slow it down, cam shaft 111 can be moved to the left so that intake valve cam lobe 114 makes contact with cam follower 112 and exhaust valve cam lobe 117 makes contact with cam follower 115. In that event, atmospheric air will be admitted to cylinder 123 through opening 126 past exhaust valve 125 when cylinder 124 is moving downward. At about the time the cylinder reaches bottom dead center, exhaust valve 125 closes and compression takes place, thereby providing a braking action to the motor. When the piston nears the extent of its upward travel, intake valve 122 is forced open and the highly compressed air is then transmitted by conduit 37 to the combustion chamber. After the piston reaches the top of its travel and commences moving downward, valve 125 again opens, admitting more atmospheric air into cylinder 123. In this way the engine acts as a braking device for the automobile and at the same time as a regenerative means for storing energy in the combustion chamber.

The details of the cam operated exhaust and intake valves are shown in FIGS. 7 and 8 respectively. Exhaust valve 125 is normally seated in opening 151 in drive motor head 152 and is flexibly coupled to rocker arm 153 by ball 154 in socket 155. Compression spring 156 bears against surface 157 on head 152 and the under surface 161 of rocker arm 153 in the vicinity of socket 155. Stem 162 extends between ball 154 and valve 125. The rocker is pivoted to shaft 163 and has bearing surface cam follower 115 on the end opposite socket 155. Cam shaft 111 has lobes 116 and 117 as previously described to open valve 125 which is normally biased closed by spring 156.

Intake valve 122 seats in opening 165 in head 152 and has a stem 166 with a ring 167 affixed thereto above projection 171 of rocker arm 172 pivoted to shaft 163. Ring 167 bears against projection 171 and supports one end of compression spring 173. The other end of the spring bears against surface 174 of cover 175. Cam follower 112 is on the end of the rocker arm opposite projection 171 and is engaged by the surface of cam shaft 111 and lobes 113 and 114. The intake view is normally biased closed by spring 173.

The sliding cam shaft of FIG. 4 has a complex surface designed to accomplish many functions which are interrelated and precisely timed. It must not only provide smoothly variable power to the drive motor, it must be able to open and close both intake and exhaust valves in the correct relationship when rotating in either the forward or reverse directions. Its capability and versatility will become apparent from the description below.

When the cam shaft is positioned so that separation space 131 between lobes 113 and 114 is aligned with cam follower 112, the motor is in a quiescent or free running condition, intake valve 122 remains closed and no power is applied. If the vehicle is moving, cam shaft 111 will continue to rotate but the intake valves will not be opened while the exhaust valves will remain open except near top dead center. It may be noted that the period of time the intake valves may be opened by either lobe 113 or 114 ranges from zero to only a relatively small fraction of total rotation of the cam shaft, in the vicinity of 20% or approximately 75°. Referring to FIGS. 5A and 5B, the varying size of lobe 113 at different points along the cam shaft is clearly apparent. Assuming that lobe 113 is used for forward power, lobe 114 will come into play when cam shaft 111 is slid to the left to provide either engine braking or reverse power. Of course the cam shaft continues to rotate in the forward direction when braking is desired but will rotate in the opposite direction when the vehicle is moving in reverse.

Somewhat different criteria govern the shape and positioning of exhaust valve cam lobes 116 and 117. The exhaust valve must be open a greater percentage of the time than the intake valve but it must be fully closed whenever piston 124 is at or closely adjacent top dead center. Sections through the forward exhaust cam lobe 116 and through the free running point between the two exhaust cam lobes are shown in FIGS. 5C and 5D, indicating the rather extensive time the exhaust valve is open. Given the configuration of the cylinder and the efficiency requirements of the engine, it is desirable that the cylinder head be flat so that at top dead center, the volume between cylinder head and piston is nearly zero. This is possible because no combustion takes place in these cylinders. The exhaust valve must be opened at the optimum moment in the cycle to ensure that no pressure impedes the upward or exhaust stroke of the piston after full adiabatic expansion for complete power usage within the cylinder. It must also be open during non-power portions of the down stroke to prevent a vacuum from forming in the cylinder, this requirement being especially pertinent during the free running condition.

In the forward power direction, lobe 116 governs the opening and closing of exhaust valve 125. This valve is fully closed when the piston reaches the top of its stroke and remains closed during the downward power stroke. As the piston approaches bottom, exhaust valve 125 opens and remains open until the piston near the top when it again closes. It may be noted that the time during which the exhaust valve is open is normally substantially greater than the open time of the intake valve. This is because the exhaust valve has broader functions, including preventing the creation of undesired vacuums and compressions as well as exhausting spent gases.

When cam shaft 111 is slid to the left while the engine is rotating in the forward direction, valve 125 becomes an intake valve and is controlled by lobe 117. Valve 125 is open while piston 124 moves downward and closes when the piston reaches bottom dead center. Compression then takes place as the piston moves upward and valve 122 opens shortly before the piston reaches top dead center. The highly compressed gas is then forced back down the supply line 37 to energy reservoir (combustion chamber) 25. With the cam shaft in the same position, but the vehicle stopped or moving in reverse, valves 122 and 125 resume their normal function but under control of lobes 114 and 117 respectively, with cam shaft 111 rotating in the opposite direction. The opening and closing relationships between the two valves is the same as for the forward power direction. The engine goes in reverse because at any time that the cam shaft is slid to the left, one or more intake valves in the engine are open which are so oriented that the power stroke causes reverse rotation.

Note that there is no longitudinal separation between lobes 116 and 117. This is because when the engine is rotating at zero torque, the exhaust valve should remain open except when the piston is at or near top dead center in order to prevent any vacuums or compressions from occurring. Thus, exhaust cam follower 115 rides along slopes 132 and 133 and across land 134 throughout most of the neutral cycle to keep valve 125 partially open, and is closed at the critical time near the top of piston travel when follower 115 contacts area 135 (right side of FIG. 4) between lobes 116 and 117, which is the surface of the cam shaft at the point. It is apparent from FIG. 4 that slopes 132 and 133 are divergent, creating the space 135. This angle of the slopes is necessary to permit the cam shaft to operate on cam follower 115 in either direction of rotation so that there is a smooth transition between the cam shaft surface and slope 132 and 133, no matter which way the cam shaft is turning. Furthermore, the slopes permit the cam shaft to slide longitudinally at any point during its rotation and follower 115 simply rides up or down the slope as the shaft slides. One way to define the slopes 132, 133 geometrically or physically is to state that each such slope is at an angle with respect to a line tangent to the surface of said cam shaft, which line is also normal to the axis of the cam shaft. Thus, it can be seen that slopes 132, 133 overlap in the vicinity of land 134 but are longitudinally spaced in the vicinity of area 135. Lobes 116 and 117 are also circumferentially spaced at area 135 to permit the exhaust valve to be closed at least between 355° and 5° of rotation of the crank shaft, assuming that 0° is top dead center.

The bearing surface 136 of follower 115 has a definite width and is flanked by bevels 137. Because of this width, follower 115 will ride up on slope 133 shortly past top dead center when in the neutral position, thereby opening the exhaust valve. Because of the angle of the slope, the follower will ride higher until it reaches its highest point near the top surface of lobe 117. Then it contacts land 134 and proceeds along slope 132, dropping lower until area 135 is reached. It may be seen that slopes 132, 133 will come into play even when the motor is under low torque in either the forward or reverse direction so that follower 115 is not affected exclusively by lobe 116 or 117 when in a power position.

Power sequences under various conditions are shown in FIGS. 12–15. In each figure, the normal intake valve is on the left and the normal exhaust valve is on the right. Top dead center is assumed to be the beginning of the cycle or 0°, while bottom dead center is 180°, always reckoning in the clockwise direction.

Figure 12:
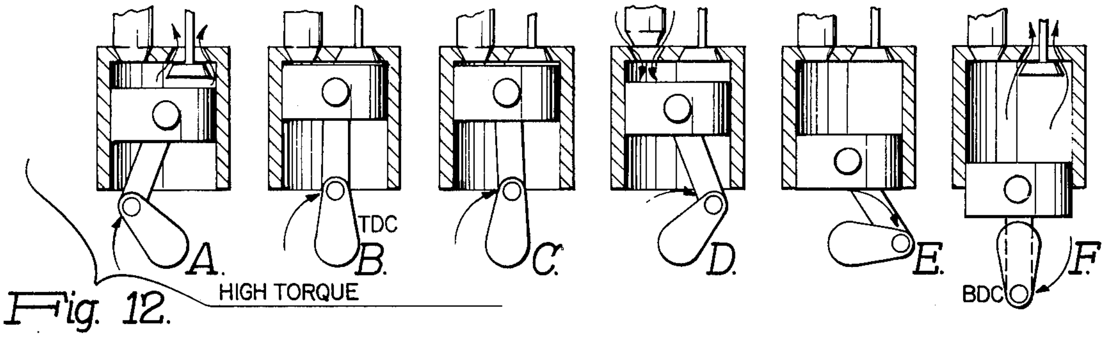
FIGS. 12A through 12F are sequence diagrams of a cylinder of the drive motor operating at high forward torque.

In FIG. 12 the motor is rotating in the forward direction under high torque. FIG. 12A shows the piston moving upward with the intake valve closed and the exhaust valve open. As the piston reaches top dead center in FIG. 12B, both valves are closed. In FIG. 12C the piston has just passed top dead center but the intake valve has not yet opened. At approximately 5° the intake valve opens (FIG. 12D) and remains open for about 75° of rotation. By the time the crank shaft has rotated 80° (FIG. 12E), the intake valve has closed and the power cycle continues as the hot gas from the combustion chamber expands. At approximately 170°, the exhaust valve opens as in FIG. 12F and remains open until 355° or just prior to the top dead center position. It should be observed that even under high torque, the intake valve is open for less than one-fourth of the cycle, because the high pressure of the gas in the combination chamber permits full power with the intake valve open for only about 75° of rotation. At the low end of the high torque range, the intake valve closes at 25° and the exhaust valve opens at 105°.

Figure 13:
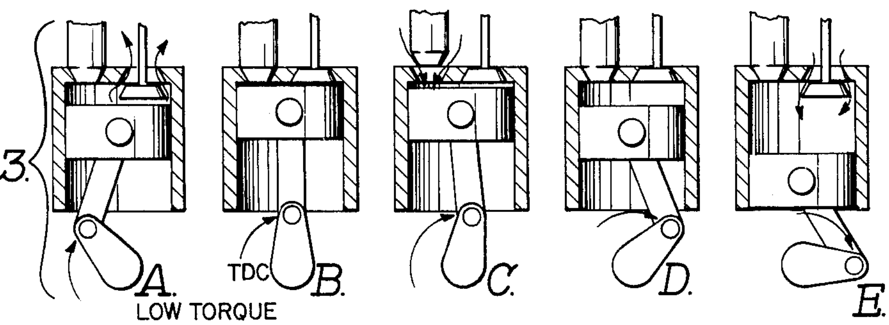
FIGS. 13A through 13E are sequence diagrams similar to FIG. 12 with the motor operating at low forward torque.

The forward low torque condition is shown in FIG. 13. FIGS. 13A and 13B are substantially the same as the equivalent FIGS. 12A and 12B. FIG. 13C shows the intake valve open at about 5° and it may close immediately or remain open until approximately 25°. Of course the time the valve is open is continuously variable from 5° up to the maximum 80° and FIG. 13 is an example in the low torque range and is not meant to be specific as to any particular value of power. In FIG. 13D the motor has rotated about 40° and both valves are closed. As the end of the useful portion of the power stroke is reached, between 20° and 105°, the exhaust valve opens and air is brought in, preventing a vacuum from being created (FIG. 13E). Between 180° and 355° exhaust occurs and the cycle is repeated with the exhaust valve always closing at 355°.

Figure 14:
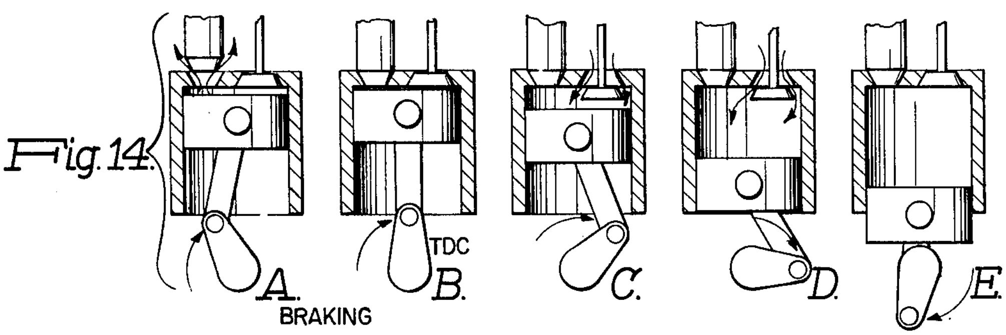
FIGS. 14A through 14E are similar sequence diagrams with the motor rotating in the forward direction under braking torque.

Forward rotation with reverse or braking torque is shown in FIG. 14. As the piston approaches top dead center (FIG. 14A) and there is significant compression to substantially more than 40 atmospheres, the intake valve opens under the pressure to allow the high pressure air in the cylinder to be forced back to energy storage chamber 25. At top dead center (FIG. 14B) both valves are closed while the exhaust valve opens at 5° (FIG. 14C) to allow air to enter the cylinder. The exhaust valve remains open (FIG. 14D) at least until 180° whereupon it closes (FIG. 14E) and compression commences. It can thus be appreciated how regenerative braking is accomplished by this system. As long as the pressure in the cylinder is greater than 40 atmospheres, energy is fed to the storage chamber through the intake valve. For regenerative braking the exhaust valve may close at any point between 180° and 355°, depending upon the amount of braking desired, while the intake valve may open as early as 330° or as late as 355°.

Figure 15:
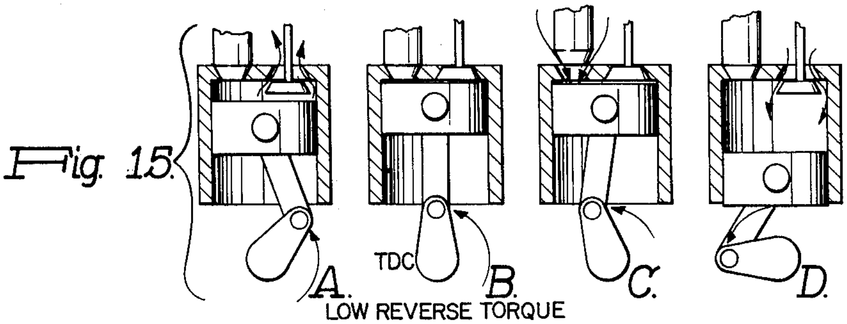
FIGS. 15A through 15D are similar sequence diagrams with the motor operating at low reverse torque.

FIG. 15 depicts the condition of the valves with the motor operating in reverse. As shown, the direction of rotation is counterclockwise, but the valves operate for their normal purpose in different sequence. As the piston moves upward in FIG. 15A, the exhaust valve is open until 5° before top dead center, when both valves are closed (FIG. 15B). At approximately 355°, the intake valve opens (FIG. 15C) and may remain open to as much as 280° if high reverse torque is desired. Conversely, the exhaust valve may open as early as 340° or as late as 180° for different reverse torques (FIG. 15D).

Figure 16:
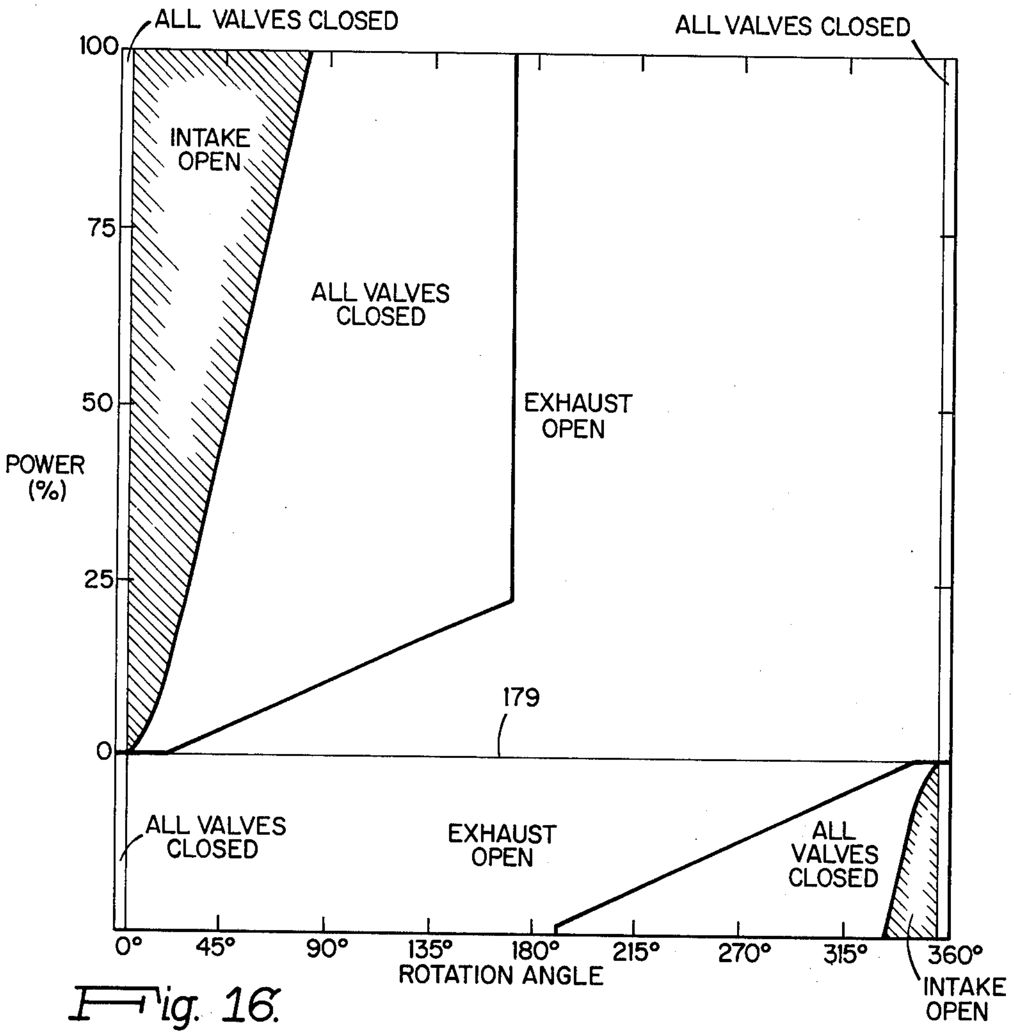
FIG. 16 is a graphical representation of FIGS. 12–14.

The valve opening and closing relationships shown in FIGS. 12–15 are set forth in graphical form in FIG. 16. The upper portion of the figure shows the valve relationships for either forward or reverse motion, and the lower portion depicts the valve relationships during regenerative braking. The two graph portions are separated by base line 179. It can be seen that the exhaust valves are open for a majority of the time while the intake valves are open for only a small percentage of the cycle.

The alternative cam shafts of FIGS. 17–20 achieve substantially the same results as cam shaft 111 and FIGS. 12–16 are generally applicable thereto. Exhaust cam shaft 308 and intake cam shaft 309 are shown in FIGS. 17 and 18 respectively. The lobe surfaces have been formed as portions of a conical surface so as to be smoothly continuous and to have a constant angle of slope in the longitudinal direction. The concial axes are always parallel to the cam shaft axis but that axis may, in effect, be moved linearly or circumferentially to generate the rather complex cam lobe surfaces.

Likewise the cam follower has a slope which is parallel to the lobe slope throughout the length of the follower surface in the cam shaft longitudinal direction. With this configuration there is always line contact between the lobe and the follower, resulting in less wear on the contacting elements than with point contact. Such line contact provides very positive follower action and assists in maintaining acceleration stresses on the follower within reasonable limits.

By forming the cam lobes as portions of cone surfaces having the cone axis parallel to the cam shaft axis, intake lobes 113 and 114 as shown in FIG. 4 cannot be formed. Specifically, the leading edges of lobes 113 and 114 are shown parallel to the cam shaft axis. In the embodiment of FIG. 18 both the leading and trailing edges of lobes 313 and 314 will have the same appearance. This is also true of exhaust lobes 316 and 317 shown in FIG. 17. Because the cam follower commences to rise up on a lobe at differing cam shaft angles, depending upon relative longitudinal position, a mechanism is provided (FIG. 18) to shift the intake cam shaft phase angle with respect to the crank shaft. For the reason that there must be a phase shift in the intake cam shaft rotational angle, there must be separate intake and exhaust cam shafts.

The exhaust cam lobes 316 and 317 will now be considered in detail. As shown in FIG. 17, there is an idle position band 321 where the cam follower (not shown) resides at idle. Note however that both lobes 316 and 317 infringe upon the space of band 321 at locations 322 and 323 respectively. This accounts for the criterion that the exhaust valve be open a large percentage of the time, even at idle or in the unpowered condition, but that it be closed at top dead center for clearance purposes. The angular distance between locations 322 and 323 permits closing of the exhaust valve at top dead center.

Lines 324 and 325 represent the locus of peak lobe height from the cam shaft axis. Lobes 316 and 317 are conical surfaces satisfying the criteria set forth previously, and their surfaces are so configured as to substantially comply with the requirements of FIG. 16, as do intake lobes 313 and 314 of FIG. 18.

Figure 10:
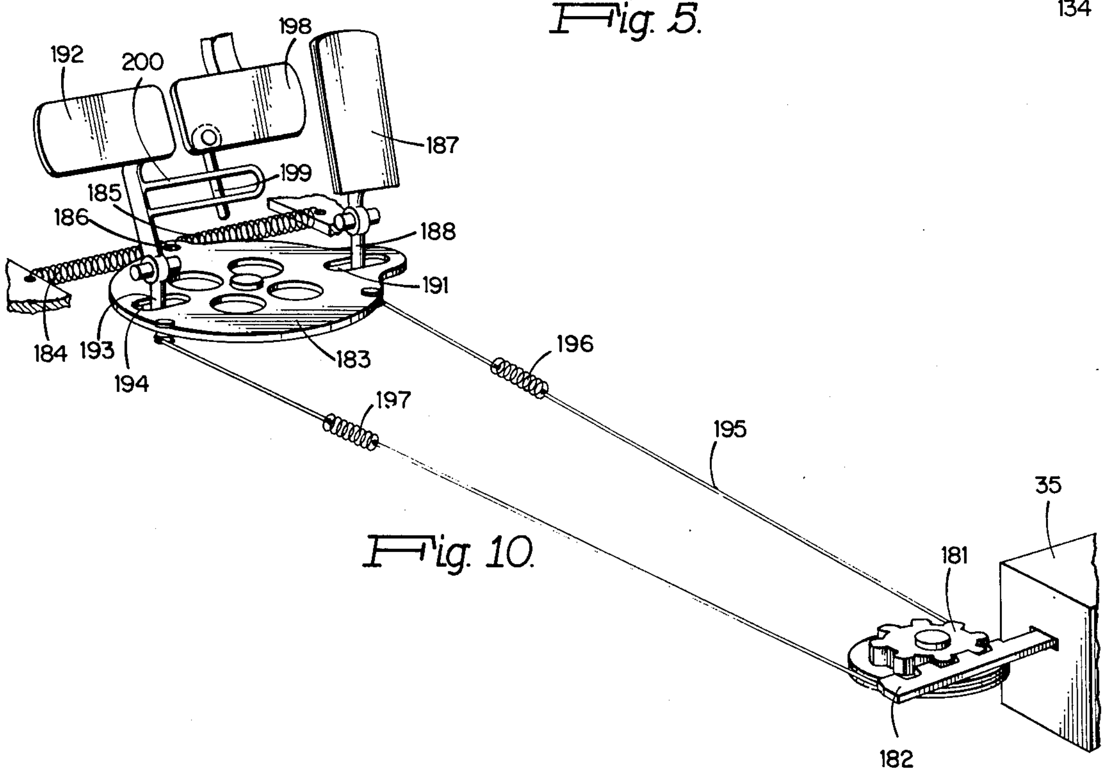
FIG. 10 is a pictorial representation of the control pedals and linkage to control the position of the cam shaft of this power system.

The phase shifting mechanism is shown in FIG. 18. Intake cam shaft 309 is coupled to exhaust cam shaft 208 by means of journaled coupling element 326. A rack 382 is formed on one end of the coupling element for engagement by pinion 381. The pinion is rotated by an accelerator pedal, as shown in FIG. 10, through cable 395. Coupling element 326 moves the intake and exhaust cam shafts longitudinally with rotation of pinion 381 but permits the cam shafts to rotate freely with respect thereto.

The cam shafts are driven rotationally by timing gears 331 and 332, respectively, to which the shafts are coupled by splined portions 333 and 334. This splined coupling permits the shafts to slide axially or longitudinally with respect to the timing gears for cam lobe adjustment as engine power requirements change.

While the spatial relationship between the exhaust and intake cam shafts is maintained, and they move axially together with coupling element 326, the intake cam shaft may be adjusted in angular rotation (phase shifted) with respect to both exhaust cam shaft 308 and crankshaft 335. A timing belt 336 rotationally couples and three shafts together through timing gears 331 and 332 coupled to the respective cams shafts and timing gear 337 mounted to the crankshaft. Belt 336 may be of any conventional design, such as a toothed rubber composition or a chain.

The phase adjusting mechanism comprises essentially of a pair of idlers 341 and 342 maintained in rigid spatial relationship with each other by arcuate rack 343 having teeth 344. Shaft 345 connects sprocket 381 with sprocket 346 so that when the accelerator is moved, cable 395 causes rotation of pinion 381 thereby rotating pinion 346. Thus as the cam shafts are moved axially, the idlers are moved transversely. It will be appreciated that transverse movement of the idlers changes the effective length of the timing belt between the intake cam shaft and crankshaft 335. There is a commensurate adjustment of the belt length between the intake cam shaft and the exhaust cam shaft. Since the belt segment 347 between crankshaft and exhaust cam shaft is fixed, transverse shifting of the idlers will result in an angular phase shift of the intake cam shaft. By relating this phase shift to axial movement of the cam shafts, it can be seen that the shape of the conical intake cam lobes can be accommodated as power requirements vary so that valve openings and closings occur substantially as shown in FIGS. 12–16.

The actions of the exhaust and intake cam lobes operating upon the respective followers are shown in FIGS. 19 and 20. FIG. 19 indicates the amount of exhaust valve opening due to one of lobes 316 and 317, that is, how wide it opens, depending upon relative speed demand. As stated previously, axial position of the exhaust cam shaft controls the amount and angular duration of opening of the exhaust valves. Angular duration of course relates to the engine cycle. For maximum power requirement, line $S_{max}$ in the graph, the exhaust valve opens rather abruptly to maximum opening at about 195° and remains open a substantial amount for about 160°, finally closing at about 355°. As less power is required, the cam follower rises up on the lobe by lesser amounts and for a somewhat shorter portion of the cycle. Note that because of the lobe contour, the maximum exhaust valve opening occurs at slightly varying angular positions for different power requirements. Also, the valve is opened a greater portion of the time at low power than is shown in FIG. 19 due to the overlap 322 or 323 of the other lobe into the neutral zone 321.

A similar graph is depicted in FIG. 20 showing the intake lobe operation. As stated previously, the amount of intake valve opening is more directly related to power requirements than is its duration of opening or than either the duration and amount of opening of the exhaust valves. Thus we see maximum opening for maximum power occurring at approximately 45° but total duration of valve opening is only about 80°. When relatively low power is required, as indicated by line S1 in the graph of FIG. 20, the intake valve does not open very wide but is still open for approximately 45° of shaft rotation.

Now it is apparent how the phase adjusting mechanism of FIG. 18 works. Because the transition between cam shaft surface and lobe surface is not parallel to the shaft axis, it is evident that intake valve opening would either be too early (before top dead center) for higher power longitudinal shaft position, or too far past top dead center for low power shaft position. To have the intake valves open at approximately 5° for each power requirement, it is necessary to accomplish a phase shift. For high power the intake cam shaft is effectively retarded and for low power the shaft is effectively advanced. Of course, a starting position may be established so that the shaft is actually only retarded or advanced therefrom.

Although phase shifting has been shown only for the intake cam shaft, it is possible that under certain conditions it would be necessary to apply a similar phase shift to the exhaust cam shaft. This could be done in a manner similar to that disclosed with respect to the intake cam shaft. Also, as discussed previously, axially shifting cam shafts could be used with the compressor motor and they would be formed with the same criteria as set forth above with respect to exhaust and intake cam shafts 308 and 309 respectively.

It should be remembered that the angles at which the valves are open are given as examples only and may vary with different cam configurations. Adjustments could be made in cylinder sizes which would also indicate valve timing changes.

With the preferred embodiment of an I-12 engine employed for supplying power to the vehicle wheels, a single long cam shaft is used and may be controlled by means such as the linkage shown in FIG. 10. A pinion 181 is pivotally mounted to the frame or rear axle adjacent one end of the drive motor. The cam shaft 111 has an extending arm formed as a rack 182 to engage the teeth of the pinion. Under the floor of the vehicle is a wheel 183 pivotally mounted to the body and biased to a neutral position by springs 184 and 185 connected at point 186 to wheel 183. The accelerator pedal for the forward direction is coupled to pin 188 which extends through slot 191 in wheel 183 while the reverse control pedal 192 is coupled to pin 193 which extends through slot 194 in the opposite side of the wheel from slot 191. By pressing either forward or reverse pedal, wheel 183 rotates, causing similar rotation of pinion 181 through coupling cable 195 which positively grips both the wheel and the pinion. Rotation of pinion 181 moves cam shaft 111 longitudinally as desired to operate the drive motor to rotate the wheels of the vehicle.

Alternatively, the coupling between control pedals and cam shaft could be by means of sprockets having a bicycle type chain around the teeth of each. Tension springs such as springs 196 and 197 could be located at some point between the two sprockets to provide for any flexibility necessary. Part of the length could be comprised of a cable so that only that portion of the coupling which wraps around the sprockets need be a chain.

The brake pedal 198 is shown with the other control pedals and it operates in a normal fashion. However, pivoted to the brake pedal is a bar 199 which is engaged by projection 200 attached to reverse pedal 192. The normal range of braking torque of the drive motor is limited by the distance the reverse pedal can travel before bar 199 is contacted. However, greater braking may be achieved by continuing to depress pedal 192 after picking up brake pedal 198. Thus, engine braking will be added to normal wheel braking for emergency stops.

Likewise, reverse torque for moving rearwardly is normally limited by bar 199 because one would not wish to combine wheel braking with reverse torque. However, for large reverse torque, bar 199 may be pivoted out of the way to permit reverse pedal 192 to be depressed as far as desired.

Figure 9:
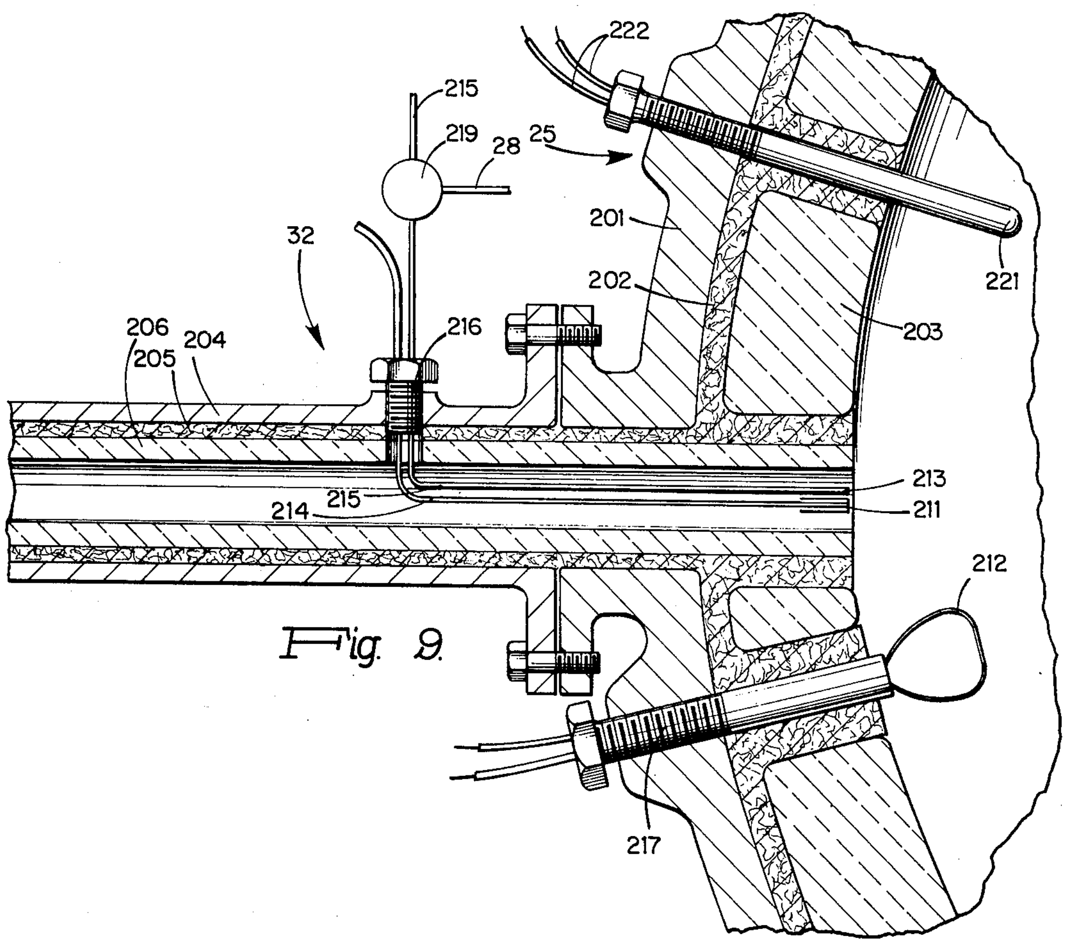
FIG. 9 is a section through a portion of the combustion chamber showing the starting apparatus.

The details of the combustion chamber or energy storage reservoir are shown in FIG. 9. It has certain requirements, among them being that it be a sufficiently strong vessel to contain gases at working pressures with a large safety factor, that it permit heat loss of only a few percent of the heat produced by combustion and that it have a volume sufficient to allow easy control of the compressor system and to provide significant energy storage of compressed gases. An example of a preferred size of the combustion chamber is that it should have a volume of approximately 100 liters, or about 50 times the total displacement of the drive motor, equivalent to approximately 30 times the displacement of the compressor motor. Since each intake valve is open only for a small percentage of each revolution, this provides a reservoir sufficient for several hundred revolutions of either motor. Finally, its weight should be within reasonable limits so that the total weight of the vehicle be substantially the same as conventional vehicles.

The chamber 25 is preferably a steel sphere 201 which offers a good strength factor coupled with optimum volume to wall area ratio. However, other shapes could be used where the important criteria are met. The interior surface of the chamber is lined with a compressible substance 202 to act as a cushion between the steel shell and firebrick 203. The cushion material could be a 1 cm layer of silica alumina felt to which is mounted a light castable insulating firebrick of about 4 cm thickness. The felt cushion allows for any differences of thermal coefficient of expansion between the steel shell and the firebrick liner, provides a cushion in case of sudden increase in pressure in the combustion chamber and adds to the insulation.

Hot gas conduits such as those to the compressor and main drive motors have a construction similar to the combustion chamber. The conduit 32 from the compressor has an outer tube 204 of steel with a 4 mm layer of felt cushion 205 and a 1 cm firebrick insulation 206, leaving an inside diameter of the conduit of about 2.5 cm for example.

The starting elements of this power system are also shown in FIG. 9. The ignition switch has an "on" position and a "start" position (FIG. 11), as well as "off" and "lock" positions. When turned to the "on" position, a pressure sensitive control on the compressor motor opens the inlet valves. This may be accomplished by means of a sliding cam shaft having forward lobes similar to lobes 113 and 116 of cam shaft 111, but it need not have reverse lobes similar to lobes 114 and 117. The pressure sensitive control may be any conventional device which is exposed to the pressure inside the combustion chamber and moves the cam shaft longitudinally in accordance with the pressure in the chamber. If the pressure is low, the cam shaft will be moved so as to open the intake valves the maximum amount. If it is high, the cam shaft will remain in its quiescent position so no power will be applied to the compressor motor. Anything in between these extremes may also occur. The pressure sensitive control could be a relatively simple spring biased piston coupled to the cam shaft of the compressor motor and moving in and out as the pressure in the combustion chamber changes. It could be enabled by a solenoid responding to the ignition switch. Other more sophisticated devices are also available in present technology to accomplish the desired purpose. The "start" position applies power to a combustion chamber wall temperature sensor, the purpose of which will be explained later. Assuming a cold start, where the temperature and pressure within the chamber 25 are approximately atmospheric, nozzle 211 is used. Through this nozzle is supplied gaseous methane or an ethanol and water mixture from appropriate small tanks. At the same time a battery supplies energy to an incandescent wire 212 which rapidly reaches a temperature to ignite the starting fuel which mixes with the air in the chamber. Because there is always excess air in the combustion chamber during normal operation, there will be plenty of air to permit the volatile starting fuel to burn. This very quickly raises the pressure in the chamber to as much as 8 atmospheres, adequate to overcome the compressor and compressor motor breakway torque which is approximately 3 atmospheres. Fuel is supplied from the fuel tank (not shown) by means of a pump 219 coupled to the compressor shaft 28, thereby injecting fuel into the chamber through nozzle 213 as fresh air enters from the compressor. The fuel/air mixture is essentially fixed at 200% excess air. This volatile mixture burns immediately, taking over from the ignited methane or ethanol, and the desired operating pressure, typically 40 atmoshperes, is reached within a few seconds. The vehicle may be operated well before the desired operating pressure is reached so it may get underway at least as quickly as a conventional Otto cycle vehicle from a cold start. The fuel nozzles 211 and 213 are at the ends of tubes 214 and 215 respectively which enter conduit 32 through coupling plug 216 in the wall of the conduit. The incandescent wire 212 enters chamber 25 through coupling plug 217.

When the combustion chamber wall temperature sensor 221 having wires 222 connected into the electrical system is energized by the "start" position of the ignition switch, several alternative procedures may commence. If the temperature in the chamber is above a predetermined value, such as 350°K, power is then supplied to the ethanol and water pump and the incandescent wire. The ethanol/water spray forms superheated steam upon entering the hot chamber, building up pressure immediately. The hot incandescent wire insures ignition of the ethanol. If the temperature is below 350°K, power is applied to a solenoid valve to open the starting fuel tank, together with the hot wire. Gaseous fuel such as methane or propane is injected through nozzle 211 and ignited by the wire 212. The pressure of the heated gases will reach approximately 8 atmoshperes before the oxygen supply is expended, adequate to commence operation of the compressor motor, which has a breakaway torque of about 3 atmospheres.

If the vehicle is to be restarted shortly after having been driven, there are four possibilities with regard to the temperature and pressure within the chamber. The temperature may be either above or below the ignition temperature for the incoming fuel, and the pressure may be either above or below that necessary to overcome the breakaway torque of the compressor and compressor motor.

When the switch is turned to "on", if the pressure is sifficient the compressor will start automatically because the intake valves of the compressor motor are then open. Air and fuel are supplied to the combustion chamber and if the temperature therein is sufficiently high, ignition is accomplished. If the temperature is too low for ignition with adequate pressure (an unlikely condition because pressure normally diminishes faster than temperature), the fuel will not ignite and the pressure will fall quickly because more gas is used to run the compressor motor than is supplied by the compressor. This is easily and quickly perceived and the switch is turned to "start" so that incandescent wire 212 ignites the fuel mixture. Ethanol and water are pumped in at the same time to aid in the pressure build-UP. If the pressure is below a value which will start the compressor, nothing happens when the switch is turned to the "on" position. When the switch is turned to "start", either methane or an ethanol and water mixture will be injected through nozzle 211 as previously described.

Figure 11:
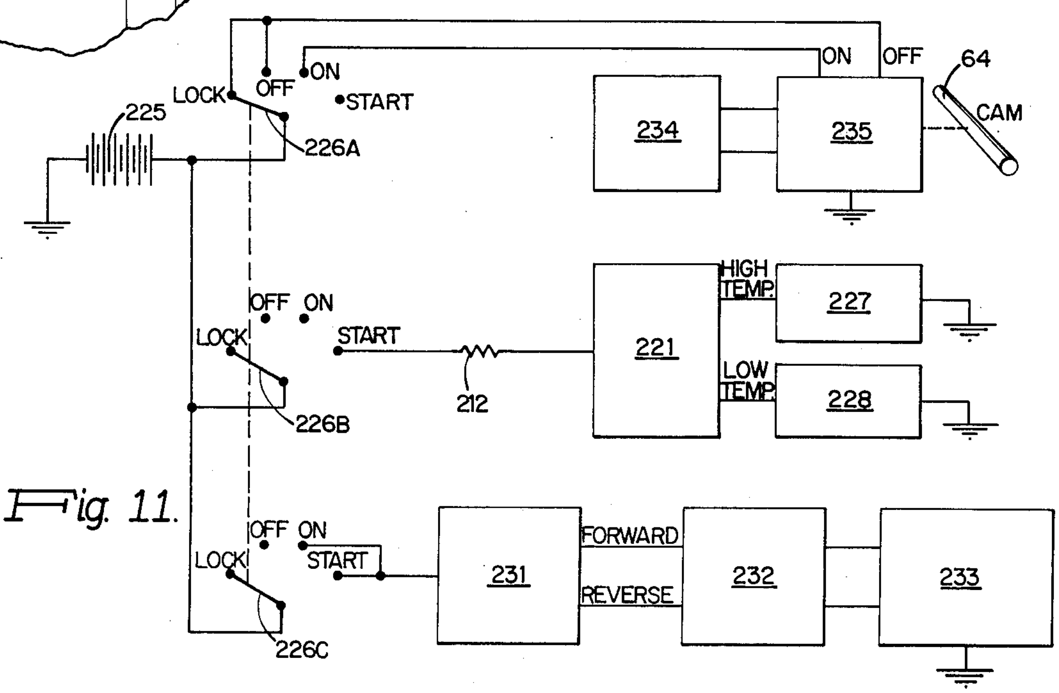
FIG. 11 is a partially schematic and partially diagrammatic representation of the electrical system which may be used with this invention.

The electrical system is shown schematically in FIG. 11. Battery 225 is coupled to the elements of the system through ganged ignition switch 226. When the switch is turned to start, hot wire 212 is energized by the battery and combustion chamber temperature sensor 221 is enabled. If the temperature is high, greater than 350°K, the ethanol and water mixture pump 227 is actuated to inject quick igniting fuel into the combustion chamber. If the temperature is below 350°K, the solenoid valve 228 opening the methane tank opens to inject methane into the combustion chamber.

The system also includes various other sensors which may be of conventional design including rear wheel direction of rotation sensor 231 and drive motor cam shaft position sensor 232 which operate together to control the drive motor manifold butterfly valve 233. When the motor is operating normally, either in forward or reverse direction, the manifold butterfly valve for the exhaust is open and the breather is closed. If the motor is operating in the forward direction under reverse torque, the manifold butterfly valve closes the exhaust and opens the breather to permit the exhaust valve to operate as intake valves.

The combustion chamber pressure sensor 234 is connected to the compressor motor cam shaft position control 235. When switch 226 is in the "off" position, the biasing spring is permitted to move the cam shaft 64 to the normal, neutral position. When the switch is "on" the control is permitted to operate under the influence of sensor 234.

It may now be appreciated the significant advantages provided by the automotive power system of this invention, and how it fulfills the criteria set forth hereinabove. Because of the size of the combustion chamber, very high torques are available for relatively short periods of time as needed. At high speeds, the system produces a low torque. One could say that at the maximum speed at which the vehicle may run, in the vicinity of 100 miles per hour, the torque is zero, the limit being the speed with which the compressor can supply compressed air to the combustion chamber. At zero speed, the torque available is extremely high. As explained above, the engine is self-starting, even under zero degree conditions, without a starter motor. Except for a very minor amount of fuel necessary to maintain combustion chamber pressure, no fuel is consumed at zero speed. With regenerative braking as an integral feature of this invention, less fuel is needed for the same output power and an already efficient system is even more efficient.

This system is inherently low polluting, even using crude oil. The fact that no refining is necessary and less fuel is used for the same mileage reduces even collateral pollution normally associated with production and delivery of gasoline. Of course, many other types of fuel may be used and crude oil is mentioned to indicate that unrefined raw fuel may be used without creating pollution. Because there is no cooling fan, no radiator, no water pump and no transmission, much less energy is used by parasitic elements. Little power is consumed by the exhaust system because it need not be nearly as rigorous as for internal combustion systems, it need only muffle the noise associated with exhaust valves opening. Because of the regenerative braking available, power brakes may not be necessary and brake drums and shoes have less wear than in a vehicle where nearly all the braking is accomplished by the mechanical brakes in the wheels. Without spark plugs, distributor points and associated paraphernalia, there are no timing and tune-up problems and maintenance is minimal.

Another advantage, although minor, is that by employing reverse and forward pedals and without a transmission, it would be easy to rock a vehicle employing this system if stuck in snow or mud. Also by having a built-in source of compressed air, one may easily include add-on features such as power steering and power brakes at little cost in energy used. It would also be a simple matter to include means for jump starting a similar vehicle with the source of compressed air, or pump up tires.

While a piston type engine with a typical crankshaft has been specifically disclosed herein, it is evident that a rotary engine with its eccentric shaft may equivalently be used. The term "crankshaft" employed herein is sufficiently broad to encompass any type of eccentric shaft used in positive displacement motors. Also the term "cylinder" has been used, which may alternately be stated to be a "positive displacement chamber".

It is likely that many modifications, alternatives and improvements will occur to those skilled in this art which are within the scope of the appended claims.

What is claimed is:

1. Longitudinally slidable cam shaft means for use in controlling the amount and duration of opening of variably opening intake and exhaust valves in a positive displacement, reversible motor, said valves having respective cam followers operatively coupled thereto, said cam shaft means comprising:

a plurality of forward intake lobes spaced longitudinally along the surface of said cam shaft means, the radial thickness and angular width of each of said forward intake lobes varying with longitudinal position on said cam shaft means, said forward intake lobes selectively engaging respective areas of said intake valve cam followers thereby opening said intake valves by different amounts and for different time durations depending upon the longitudinal position of said cam shaft means with respect to said intake valve cam followers;

a plurality of forward exhaust lobes spaced longitudinally along the surface of said cam shaft means, the radial thickness and angular width of each of said forward exhaust lobes varying with longitudinal position on said cam shaft means, said forward exhaust lobes selectively engaging respective ones of said exhaust valve cam followers thereby opening said exhaust valves by different amounts and for different time durations depending upon the longitudinal position of said cam shaft means with respect to said exhaust valve cam followers;

a plurality of reverse intake lobes spaced longitudinally along the surface of said cam shaft means adjacent to and in skewed symmetric relation with said forward intake lobes, the radial thickness and angular width of each of said reverse intake lobes varying with longitudinal position on said cam shaft means, said reverse intake lobes selectively engaging respective ones of said intake valve cam followers thereby opening said intake valves by different amounts and for different time durations depending upon the longitudinal position of said cam shaft means with respect to said intake valve cam followers when said cam shaft means is shifted longitudinally to its reverse position so that said reverse intake lobes are aligned with said intake valve cam followers; and a plurality of reverse exhaust lobes spaced longitudinally along the surface of said cam shaft means adjacent to and in skewed symmetric relation with said forward exhaust lobes, the radial thickness and angular width of each of said reverse exhaust lobes varying with longitudinal position on said cam shaft means, said reverse exhaust lobes selectively engaging respective ones of said exhaust valve cam followers thereby opening said exhaust valves by different amounts and for different time durations depending upon the longitudinal position of said cam shaft means with respect to said exhaust valve cam followers when said cam shaft means is shifted longitudinally to its reverse position so that said reverse exhaust lobes are aligned with said exhaust valve cam followers.

2. The cam shaft means of claim 1 wherein said adjacent forward and reverse intake lobes are spaced longitudinally by at least the width of said intake valve cam follower.

3. The cam shaft means of claim 2 wherein said adjacent forward and reverse exhaust lobes are longitudinally separated on one side of said cam shaft means by at least the width of said exhaust valve cam follower, whereby when said cam shaft means is in neutral position, said intake valves remain closed throughout a complete cycle of operation, and said exhaust valves remain closed at least in the vicinity of the top dead center position.

4. The cam shaft means of claim 2 wherein said forward and reverse intake lobes are arranged in skewed symmetric pairs on said cam shaft means surface, said reverse intake lobe being adjacent to said forward intake lobe and spaced longitudinally and angularly therefrom, said forward and reverse intake lobes being configured substantially identically.

5. The cam shaft means of claim 4 wherein said forward and reverse exhaust lobes are arranged in skewed symmetric pairs on said cam shaft means surface, said reverse exhaust lobe being adjacent to said forward exhaust lobe and spaced longitudinally and angularly therefrom, said forward and reverse exhaust lobes being configured substantially identically.

6. The cam shaft means of claim 5 wherein:

said forward and reverse intake lobes in each pair are longitudinally spaced by at least the width of said intake valve cam follower;

said forward and reverse exhaust lobes in each pair are longitudinally separated on one side of said cam shaft means by at least the width of said exhaust valve cam follower;

whereby when said cam shaft means is in neutral position, said intake valves remain closed throughout a complete cycle of operation, and said exhaust valves remain closed at least in the vicinity of the top dead center position.

7. The cam shaft means of claim 6 wherein said forward and reverse exhaust lobes overlap in the bottom dead center position of said cam shaft means so that when said cam shaft means is in the neutral longitudinal position, said exhaust valves are open at the bottom dead center position.

8. The cam shaft means of claim 7 wherein each of said forward and reverse exhaust cam lobes has a radially projecting sloping surface, said surface being at an angle with respect to a line tangent to the surface of said cam shaft means and normal to the axis thereof, said forward and reverse exhaust cam lobe radially projecting sloping surfaces facing in generally opposite directions with respect to the longitudinal axis of said cam shaft means, whereby said sloping surfaces diverge from a condition of overlap in the vicinity of the bottom dead center position while being separated in the vicinity of the top dead center position.

9. The cam shaft means of claim 8 wherein the transitional surfaces of said cam lobes are so configured that said intake and exhaust valve cam followers easily and smoothly ride up onto and down off said cam lobe surfaces when said cam shaft means rotates in the forward direction, in the reverse direction, or slides longitudinally in either direction.

10. The cam shaft means of claim 1 wherein said forward and reverse intake and exhaust lobes are formed on the surface of a single cam shaft.

11. The cam shaft means of claim 1 wherein said forward and reverse exhaust lobes are formed on the surface of an exhaust cam shaft and the forward and reverse intake lobes are formed on the surface of a separate intake cam shaft.

12. The cam shaft means of claim 11 wherein said forward and reverse exhaust lobes are identically formed as portions of a cone of constant slope wherein the axis of said cone remains parallel to the axis of said exhaust cam shaft.

13. The cam shaft means of claim 12 wherein said forward and reverse intake lobes are identically formed as portions of a cone of constant slope wherein the axis of said cone remains parallel to the axis of said intake cam shaft.

14. The cam shaft means of claim 11 and further comprising:

means for sliding said exhaust and intake cam shafts longitudinally; and means for causing a phase shift between said intake cam shaft and said exhaust cam shaft.

15. The cam shaft means of claim 14 wherein said cam shaft sliding means comprises:

a coupling element to which said exhaust and intake cam shafts are rotatably coupled for simultaneous longitudinal motion;

a rack mounted to said coupling element; and a pinion meshing with said rack whereby rotation of said pinion moves said coupling element and said exhaust and intake cam shafts longitudinally.

16. The cam shaft means of claim 14 wherein said phase shifting means comprises:

a first timing gear to which said exhaust cam shaft is slidably engaged for rotation therewith;

a second timing gear to which said intake cam shaft is slidably engaged for rotation therewith;

a timing belt engaging the circumferential surfaces of said first and second timing gears;

means for driving said timing belt to cause said exhaust and intake cam shafts to rotate; and transversely movable idler means engaging said timing belt so as to change the effective length of said timing belt between said first and said second timing gears thereby causing a phase shift of said intake cam shaft with respect to said exhaust cam shaft.

17. The cam shaft means of claim 16 wherein the amount of phase shift of said intake cam shaft is proportional to the longitudinal movement of said exhaust and intake cam shafts.

18. The cam shaft means of claim 16 wherein:

said idler means comprises two wheels, one engaging said timing belt between said first and second timing gears, the other engaging said timing belt between said second timing gear and said driving means;

said idler wheels being coupled together to move transversely in unison, thereby also changing the effective length of said timing belt between said second timing gear and said driving means, the effective length of said timing belt between said driving means and said exhaust cam shaft remaining constant.

* * * * *